Sept. 2, 1952  L. S. VAN ANTWERP  2,609,218
WHEEL SHIELD SUPPORT
Filed March 16, 1950

Lyle S. Van Antwerp
INVENTOR.

BY Clarence A. O'Brien
and Harvey B. Jacobson
Attorneys

Patented Sept. 2, 1952

2,609,218

UNITED STATES PATENT OFFICE 2,609,218

WHEEL SHIELD SUPPORT

Lyle S. Van Antwerp, Washington, D. C.

Application March 16, 1950, Serial No. 149,928

6 Claims. (Cl. 280—153)

This invention relates to new and useful improvements in wheel shielding devices for vehicle fenders and the primary object of the present invention is to provide a wheel shield support that is quickly and readily applied to or removed from a fender in a convenient manner.

Another very important object of the present invention is to provide a wheel shield device so constructed as to permit the same to rest against a fender without in any way harmfully effecting the finish of the fender.

Yet another object of the present invention is to provide a wheel shield support embodying cushioning means that will prevent rattling or banging during movement of a vehicle on which the support is mounted.

A further object of the present invention is to provide a closure means for the wheel opening in a fender including a plurality of resilient fingers that are adapted to be yieldingly received in apertures provided in the inturned flange of a vehicle fender.

A still further aim of the present invention is to provide a device of the aforementioned character that is extremely neat and attractive in appearance to add to the attractiveness of a vehicle on which the same is mounted, strong and reliable in use, convenient to remove and replace for access to a vehicle wheel, inexpensive to manufacture and install, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
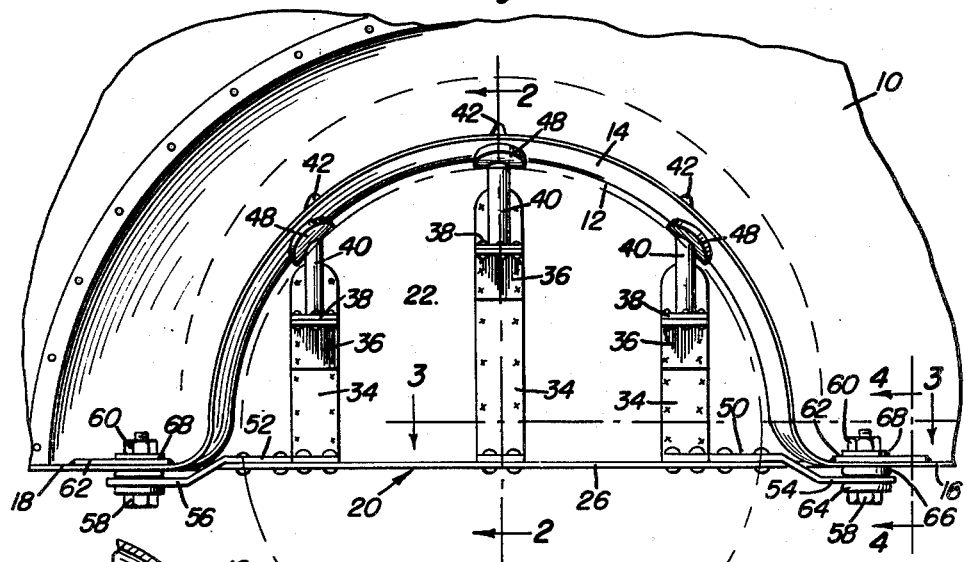
Figure 1 is an inside elevational view of a vehicle fender and showing the present invention mounted thereon.

Referring now to the drawings in detail, wherein for the purpose of illustration, there is disclosed a preferred embodiment of the present invention, the numeral 10 represents a vehicle fender having the usual wheel opening 12 therein. The fender 10 includes an inturned flange 14, about the opening 12, having horizontal end portions 16 and 18.

The wheel shield device 20, constituting the present invention, is composed of a closure member or semi-circular plate 22 whose curved edge is rolled inwardly to form a channel or flanged portion 24. The straight lower edge of the member 22 is also turned inwardly to form a lower flanged portion 26.

Figure 2:
Figure 2 is an enlarged vertical sectional view taken substantially on the plane of section line 2—2 of Figure 1.
Figure 3:
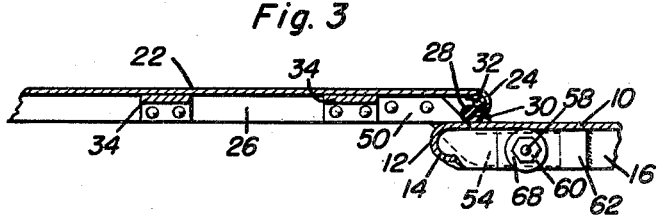
Figure 3 is a horizontal sectional view taken substantially on the plane of section line 3—3 of Figure 1; and, Figure 4 is an enlarged detail sectional view taken substantially on the plane of section line 4—4 of Figure 1.
Figure 4:
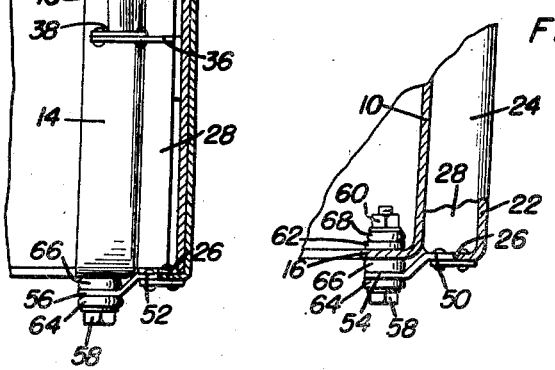

An elongated resilient strip 28 is received in the channel 24 and includes an extension 30 that is interposed between the channel 24 and the outer surface of the fender 10, as shown in Figures 2 and 3, to prevent the channel 24 from marring or scratching the surface of the fender. A spring wire member 32, embraced by the strip 28 and received in the channel 24, yieldingly retains the strip 28 within the channel 24, although any suitable means may be employed for holding the strip 28 within the channel 24.

Means is provided for aligning and retaining the closure member 22 in registry with the opening 12, and this means comprises a plurality of spaced parallel reinforcing and strengthening strips 34 that are welded or otherwise suitably and permanently fixed to the inner surface of the closure member 22. An angle bracket 36 is fixed by welding or the like to each of the strips 34 and these brackets 36 underlie and are spaced from the flange 14 as shown in Figures 1 and 2 of the drawings.

The flanged portions 38 of a plurality of upstanding hollow resilient fingers or retaining members 40 are secured by rivets or the like to the horizontal flanges of the angle brackets 36. The fingers 40 include rounded upper end portions 42 and reduced portions 44 joining the rounded upper end portions 42.

The fender flange 14 is provided with a plurality of vertical apertures 46 that receive resilient or rubber grommets or sleeves 48 and the reduced portions 44 of the fingers 40 are yieldingly received in the sleeves 48, as shown in Figure 2 of the drawings, to prevent movement of the closure member relative to the fender until access to the wheel, shielded by the closure member, is desired at which time a manual force will be sufficient to remove the fingers from the sleeves.

Additional means is provided for detachably securing the closure member 22 to the fender. This latest means includes a pair of attaching arms 50 and 52 that are secured by rivets or the like to the upper face of the lower flanged portion 26. These arms 50 and 52 include laterally and longitudinally offset end portions 54 and 56 that underlie the end portions 16 and 18 respectively.

Bolts 58 extend upwardly through the end portions 54, 56 and the end portions 16, 18 of the flange 14 and the upper ends of the bolts are threaded to receive nuts 60. Reinforcing plates 62, overlying the end portions 16 and 18, are secured by welding or the like to the end portions 16 and 18 and the bolts 58 also extend through the plates 62.

Resilient or rubber washers 64 are received on the bolts 58 and are positioned between the heads of the bolts and the end portions 54, 56. Other resilient or rubber washers 66 are received on the bolts 58 and are located between the end portions 54, 56 and the end portions 16, 18. Additional washers 68 are received on the bolts 58 and are positioned between the nuts 60 and the reinforcing plates 62.

In practical use of the present invention, the device 20 is applied to the fender 10 by inserting the fingers 40 into the sleeves 48 and then applying the bolts 58, cushioning and anti-rattling sleeves 64 and 66, washers 68, and nuts 60.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a vehicle fender having a wheel opening and an inturned flange about the opening and including horizontal end portions, a wheel shield device comprising a closure member in registry with the opening, means carried by the closure member engaging the flange to retain the closure member in registry with the opening, attaching arms carried by said closure member and underlying said end portions, bolts extending through said arms and said end portions, said bolts including lower head portions and upper threaded portions, nuts threaded on the upper portions of said bolts, and resilient cushioning washers received on said bolts and located between said end portions and said arms and also between said head portions and said arms, said closure member including a flanged portion concentric with and radially outwardly from said opening, and a cushioning strip supported on said flanged portion and resting against the fender about the opening.

2. In a vehicle fender having a wheel opening and an inturned flange about the opening and including horizontal end portions, a wheel shield device comprising a closure member in registry with the opening, means carried by the closure member engaging the flange to retain the closure member in registry with the opening, attaching arms carried by said closure member and underlying said end portions, bolts extending through said arms and said end portions, said bolts including lower head portions and upper threaded portions, nuts threaded on the upper portions of said bolts, and resilient cushioning washers received on said bolts and located between said end portions and said arms and also between said head portions and said arms, said flange including a plurality of spaced apertures, reinforcing strips on the inner face of said closure member, and a plurality of upstanding hollow resilient fingers mounted on said strips and yieldingly received in said apertures.

3. The combination of claim 2 and resilient sleeves retained in said apertures and yieldingly receiving said fingers.

4. In a vehicle fender including a wheel opening and an inturned flange about the opening and having horizontal end portions and spaced apertures, a wheel shield device comprising a closure member in registry with the opening and including a flanged portion about the opening and disposed radially outwardly from the edge defining the opening, a resilient strip on said flanged portion yieldingly bearing against the fender radially outwardly from the edge defining the opening, means carried by the closure member yieldingly engaged in the apertures in the flange for aligning and retaining the closure member in registry with the opening, and additional means mounted on said closure member and attached to the end portions of said flange for holding the closure member on the fender.

5. In a vehicle fender shield including a wheel opening and an inturned flange about the opening, a wheel shield device comprising a closure member supported in registry with the opening and including an inner face, a plurality of reinforcing strips fixed to the inner face of said closure member, angle brackets secured to said strips and including horizontal flanges, an upstanding hollow and resilient finger supported on the horizontal flange of each angle bracket, said fingers including rounded upper end portions, said inturned flange including openings, and resilient sleeves secured in said openings and yieldingly engaging the upper end portions of said fingers.

6. The combination of claim 5 wherein said plurality of fingers includes a central finger and a pair of end fingers, said fingers being spaced parallel to each other.

LYLE S. VAN ANTWERP.

REFERENCES CITED

The following references are of record in the file of this patent:

UNITED STATES PATENTS

| Number | Name | Date |
|---|---|---|
| 1,295,034 | Hughes | Feb. 18, 1919 |
| 2,048,862 | Haltenberger | July 28, 1936 |
| 2,068,732 | Cadwallader | Jan. 26, 1937 |
| 2,161,160 | Harroun et al. | June 6, 1939 |
| 2,257,556 | Webb | Sept. 30, 1941 |
| 2,261,376 | Jandus | Nov. 4, 1941 |
| 2,557,145 | Schatzman | June 19, 1951 |